United States Patent
Medina et al.

(10) Patent No.: US 6,778,399 B2
(45) Date of Patent: Aug. 17, 2004

(54) WIRE LEVER ACTUATOR MECHANISM FOR OPTICAL TRANSCEIVER

(75) Inventors: Raul Medina, Chicago, IL (US); Bruce A. Peterson, Schaumburg, IL (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 10/146,197

(22) Filed: May 15, 2002

(65) Prior Publication Data

US 2003/0214789 A1 Nov. 20, 2003

(51) Int. Cl.[7] .......................... H05K 7/00; H01R 13/62; H01R 13/64
(52) U.S. Cl. ................ 361/729; 361/728; 361/752; 361/755; 361/759; 439/372
(58) Field of Search .................... 361/752, 755, 361/756, 759, 728, 729, 753, 796, 798, 775, 727, 730; 439/372, 76.1, 352, 157

(56) References Cited

U.S. PATENT DOCUMENTS 6,430,053 B1 * 8/2002 Peterson et al. ............ 361/728
6,439,918 B1 * 8/2002 Togami et al. .............. 439/372
2003/0171022 A1 * 9/2003 Distad et al. ............... 439/372

* cited by examiner

Primary Examiner—Evan Pert
Assistant Examiner—Thanh Y. Tran
(74) Attorney, Agent, or Firm—Karl D. Kovach (57) ABSTRACT

A pluggable transceiver module comprising a housing having a first side and a face perpendicular to the first side, and a tab extending beyond the surface of the first side, and the tab sized to mate with a slot in a receptacle of a host device for receiving the pluggable transceiver module housing; a member slidably mounted on the first side proximate the tab; a lever rotatably mounted on the housing, whereby rotating the lever causes the member to slide between the tab and the slot on the receptacle and remove the tab from within the slot, thereby releasing the pluggable transceiver module from the receptacle. The lever includes a free end and a rotatably mounted end, the rotatably mounted end including an extension adjacent to the member, such that extending the free end outward causes the extension to drive the member inward.

14 Claims, 9 Drawing Sheets

*Fig. 9d*

WIRE LEVER ACTUATOR MECHANISM FOR OPTICAL TRANSCEIVER

BACKGROUND OF THE INVENTION

1. Field of the Invention

The present invention relates generally to optical transceiver modules, and more particularly, to a pluggable optical transceiver module having a lever or bail actuator release mechanism for disengaging the transceiver module from a host device, receptacle or port.

2. Discussion of the Background

Optoelectronic transceivers are utilized to interconnect circuit cards of communication links and other electronic modules or assemblies. Various international and industry standards define the type of connectors used to interface computers to external communication devices such as modems, network interfaces, and other transceivers. A well-known type of transceiver module developed by an industry consortium and known as a Gigabit Interface Converter (GBIC) provides an interface between a computer and an Ethernet, Fibre Channel, or other data communication environment. Transceiver modules are disclosed in U.S. Pat. Nos. 5,717,533; 5,734,558; 5,864,468; 5,879,173; 6,570,768; and Re 36,820, all of which are hereby incorporated herein by reference.

Miniaturization of these transceivers is desirable in order to increase the port density associated with the network connection (switch boxes, cabling patch panels, wiring closets, computer I/O, etc.). Various standards are known that define form factors for miniaturized electronic devices, such as the Small Form-Factor Pluggable (SFP) standard that specifies an enclosure 9.8 millimeters in height by 13.5 millimeters in width and having a minimum of 20 electrical input/output connections. The specific standards for SFP transceivers are set forth in the "Small Form-Factor Pluggable (SFP) Transceiver Multisource Agreement (MSA)," dated Sep. 14, 2000, which Applicants hereby incorporate by reference.

In order to maximize the available number of transceivers per area, multiple SFP transceivers modules are generally arranged in rows and columns. Each SFP transceiver module is plugged into a receptacle or cage. These receptacles are generally stacked to maximize the number of available transceiver modules per allotted area. In such stacked configurations, a release mechanism is necessary to remove a transceiver module from within a receptacle. The release lever generally is located on the bottom and embedded behind the face of the transceiver module. A special tool or probe must be inserted into a small slit on an external face of the transceiver module in order to access and depress the release mechanism. The requirement of a tool for removing the transceiver module is not only inconvenient, but also prevents an operator from removing a transceiver module if he or she does not have a tool at the appropriate time. The requirement of a tool results in increased installation cost and/or repair time.

Furthermore, other release mechanisms for transceiver modules rely on an ejection spring of the host receptacle to push the module out of the host receptacle when the module is released. If the ejection spring of the host receptacle is weak or defective, the module may not be ejected far enough to enable an operator to remove the module by hand. Furthermore, if the module is jammed or not properly located within the host receptacle, or there is excessive friction between the module and the host receptacle, the ejection spring of the host receptacle may be unable to properly eject the module.

OBJECTS AND SUMMARY OF THE INVENTION

In view of the foregoing, it is an object of the present invention to provide a release mechanism for a transceiver module that does not require a tool to operate.

A second object of the present invention is to provide an easily operable release mechanism at minimal cost.

A third object of the present invention is to provide a lever that functions as both a release and a removal lever.

Another object of the present invention is to provide a release and removal mechanism that can be operated by hand without any tools.

A further object of the present invention is to provide a release and removal mechanism that can be easily assembled.

An additional object of the present invention is to provide a release and removal mechanism for a transceiver module that does not increase the overall height and width of the transceiver module.

According to the present invention, the device includes a housing, a printed circuit board, a member, and a lever. The housing includes a surface and a tab projecting from the surface. The printed circuit board is mounted to the housing. The printed circuit board includes contact traces. The member is positioned near the tab. The member is moveable relative to the tab and to the surface of the housing in only a translational direction and not a rotational direction. The member is made of a substantially rigid material. The member includes an actuation surface. The lever is rotatably mounted to the housing. The lever includes a rotatably mounted portion and a free end. The rotatably mounted portion includes a bump, and the free end forms a handle. In a locked position of the lever, the handle is positioned adjacent to the housing and the bump is positioned away from the housing, and the bump contacts the actuation surface of the member, and the member is separated from the tab by a first distance. In an un-locked position of the lever, the handle is positioned away from the housing and the bump is positioned adjacent to the housing, and the bump contacts the actuation surface of the member, and the member is separated from the tab by a second distance. The fist distance is greater than the second distance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
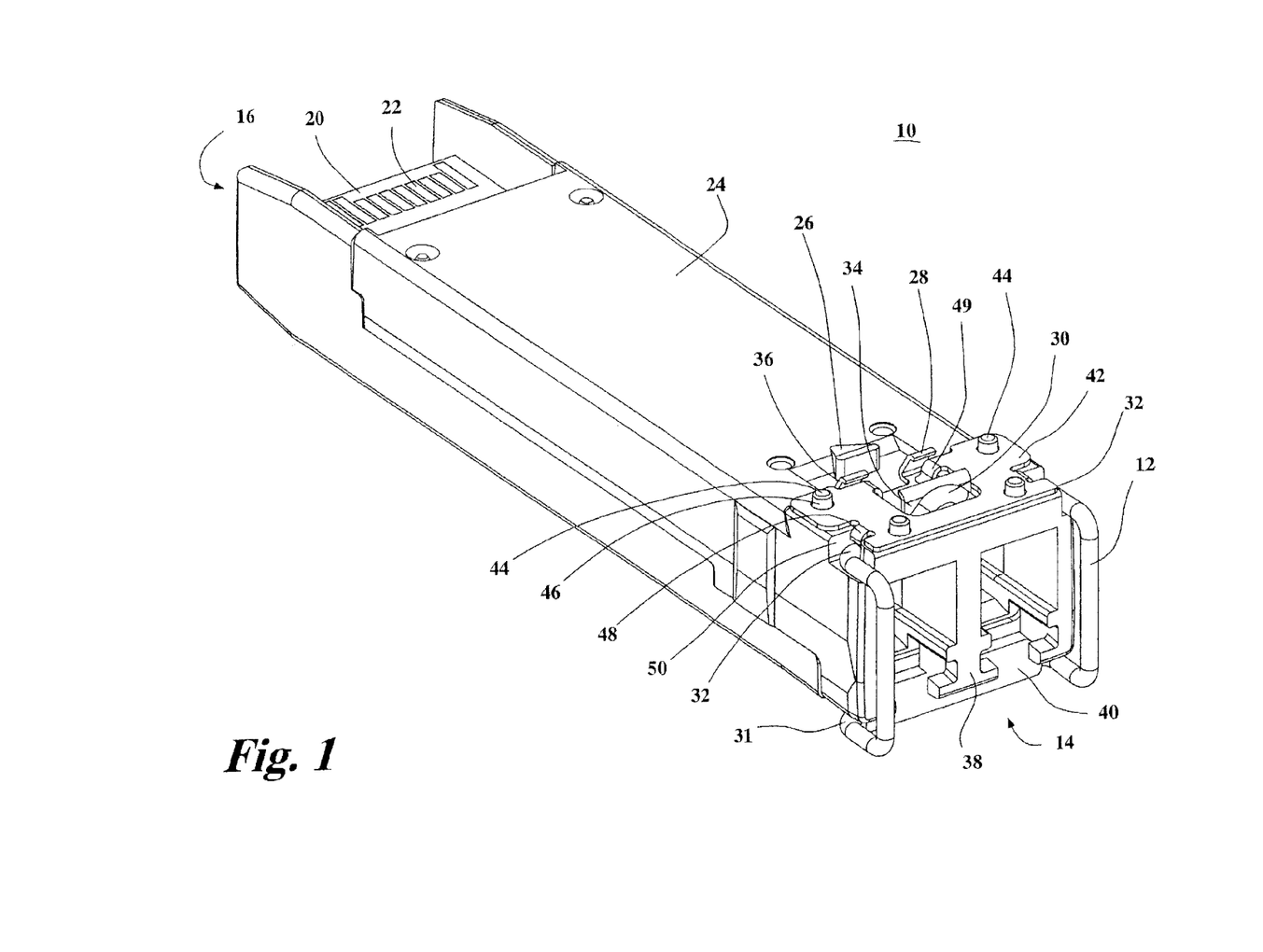
FIG. 1 is a perspective view of an optical transceiver module having a release lever configured in accordance with present invention.
Figure 2:
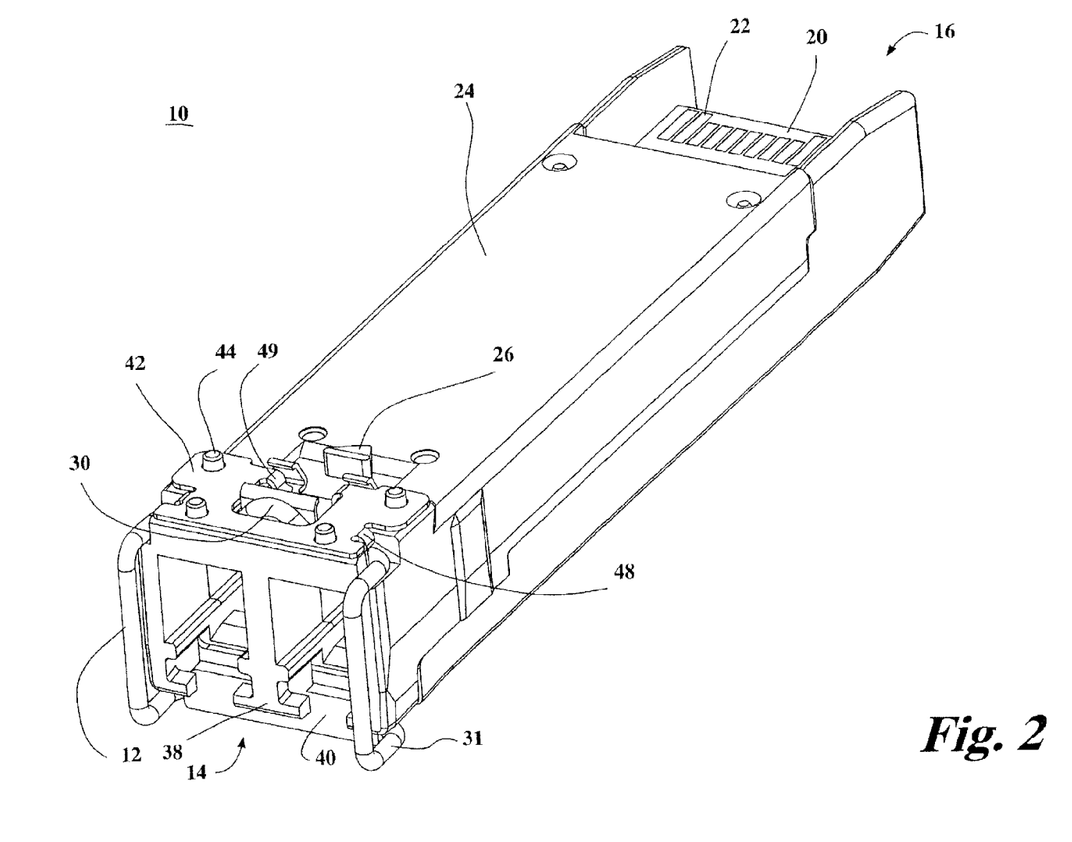
FIG. 2 is a perspective view of the transceiver module shown in FIG. 1 from a different angle.
Figure 3:
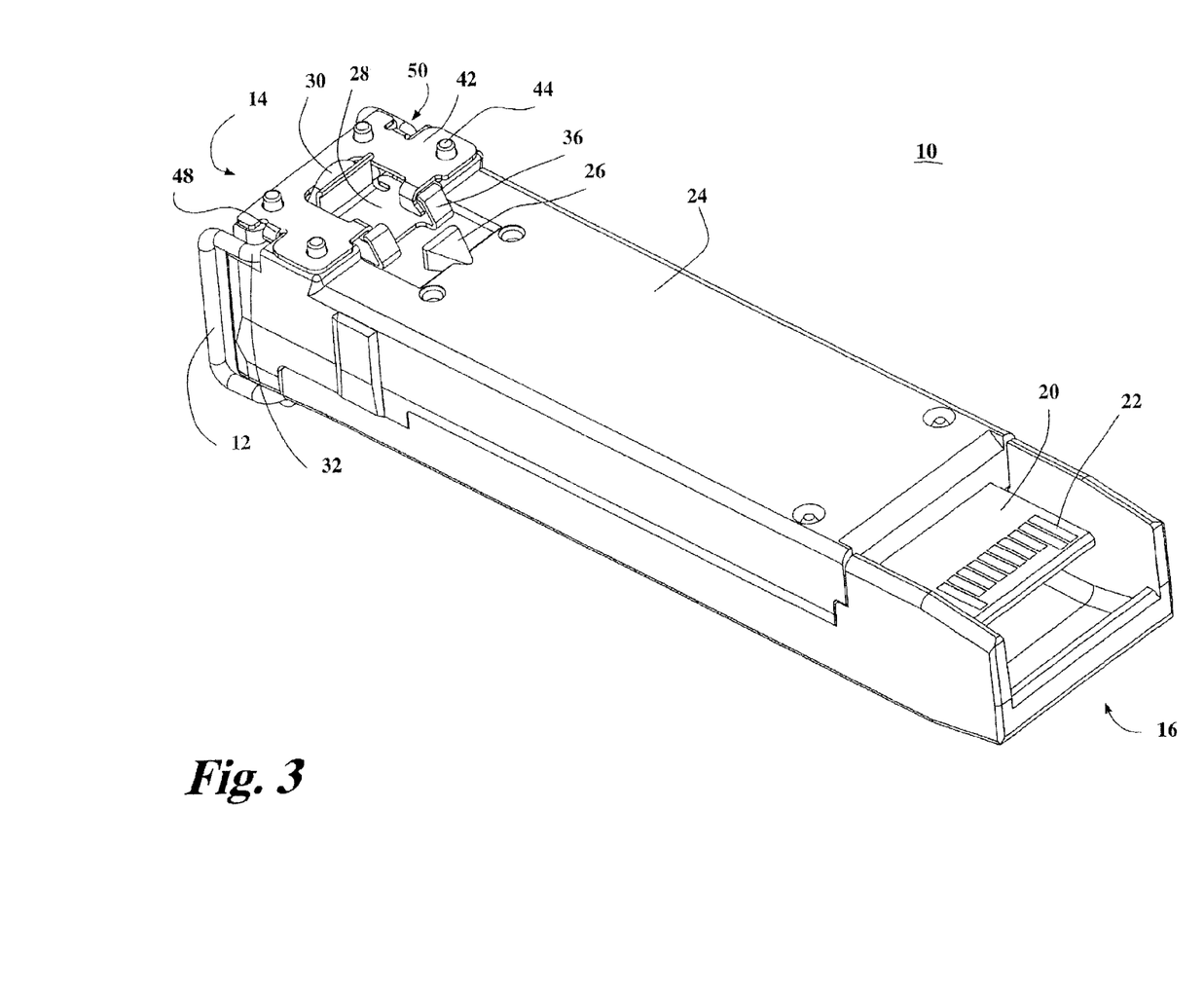
FIG. 3 is a perspective view of the transceiver module shown in FIGS. 1 and 2 from a different angle.
Figure 4:
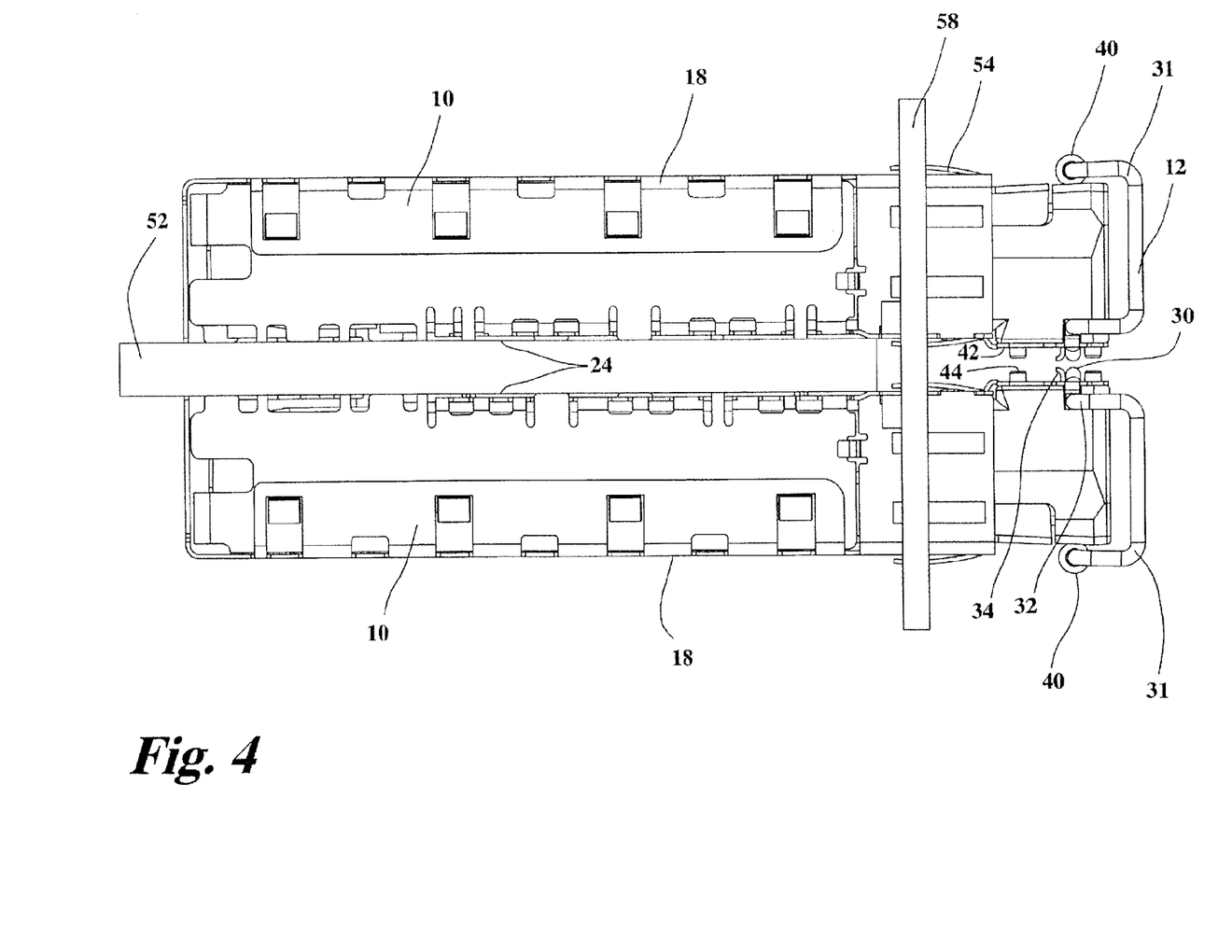
FIG. 4 is a side view of a circuit board having transceivers on the top and the bottom of the circuit board configured in accordance with the present invention.
Figure 5:
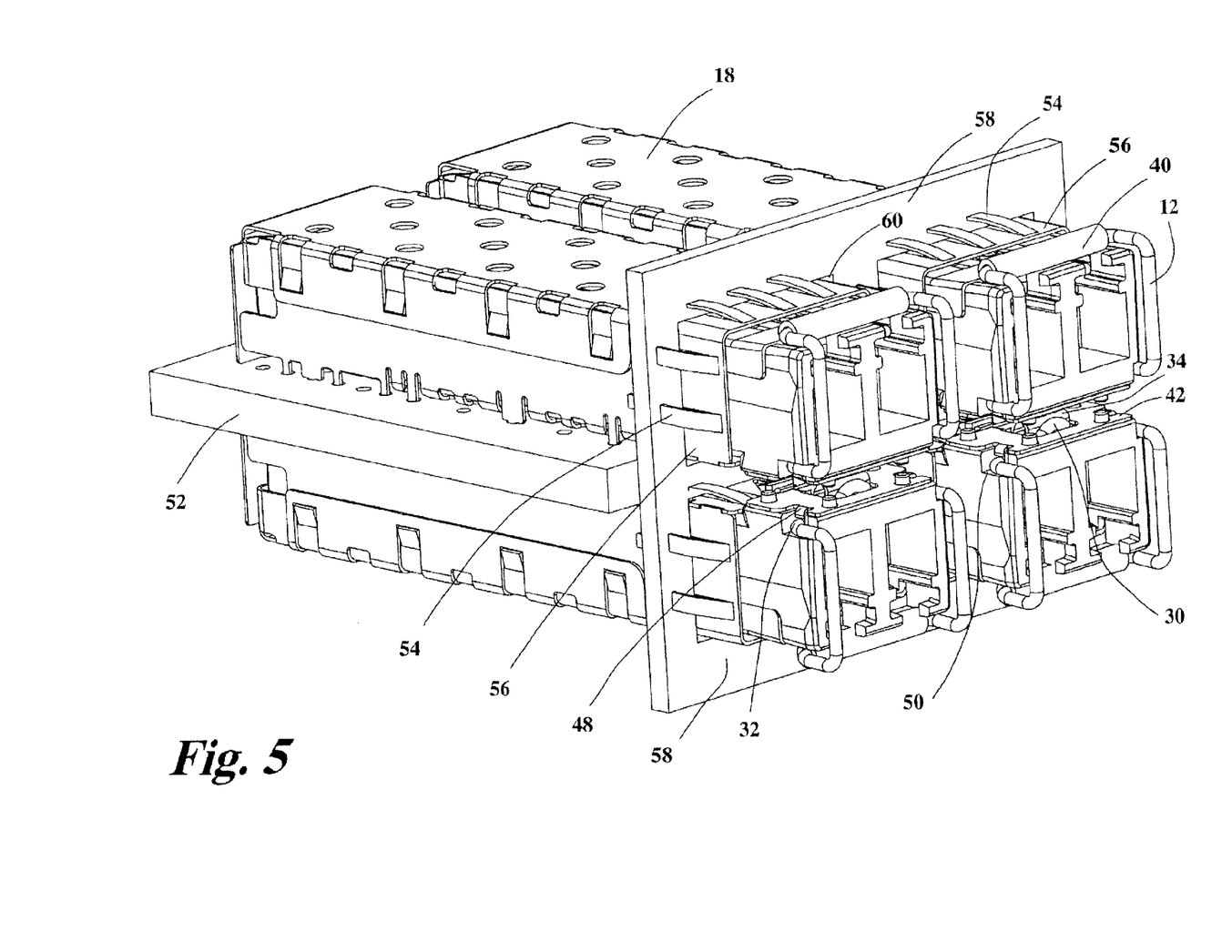
FIG. 5 is a perspective view of the circuit board and transceivers shown in FIG. 4.
Figure 6:
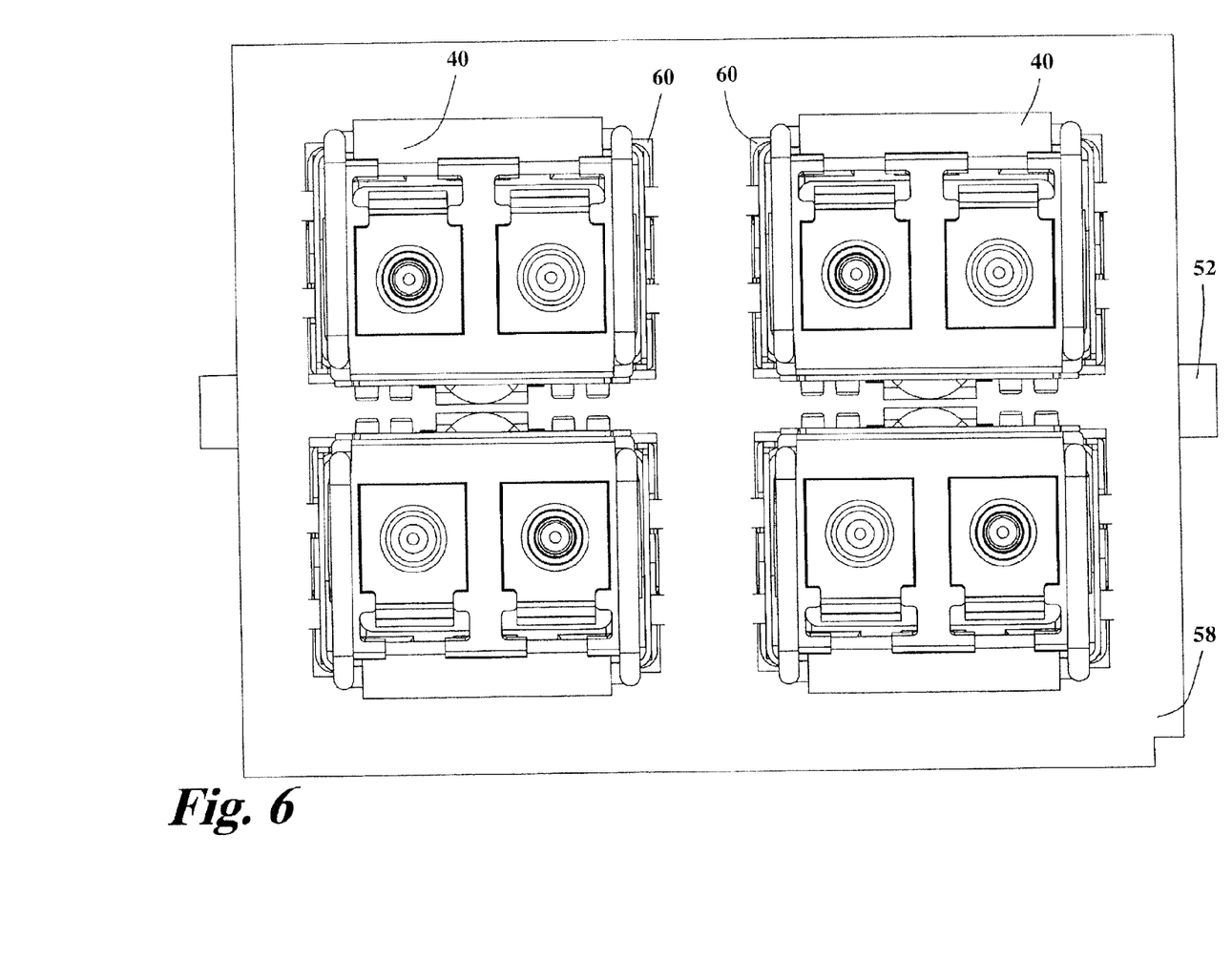
FIG. 6 is an end view of the circuit board and transceivers shown in FIG. 4.

Referring now to the drawings, FIGS. 1–3 show a pluggable transceiver module 10 having a release lever or bail actuator 12 configured in accordance with the present invention. The release lever 12 is located at a first end 14 of the transceiver module 10. A second end 16 of the transceiver module 10 is to be plugged into a host device or host receptacle 18 (FIGS. 4–6). A printed circuit board (PCB) 20 is exposed at the second end 16. The PCB 20 includes contact traces of a male portion of a card edge connector, or a male portion of a ribbon connector 22 for mating with a host receptacle.

A first side or bottom 24 of the transceiver module 10 includes a tab 26 that extends beyond the planer surface of the bottom 24. The surface of the tab 26 is inclined upwards towards the first end 14. The tab 26 is preferably triangular in shape. During insertion of the transceiver module 10 into a host receptacle, the tab 26 slides under a bendable portion, typically, into a slot on a host receptacle in order to lock the transceiver module 10 within a host receptacle.

In order to remove the transceiver module 10 from a host receptacle, a slidably mounted member or wedge 28 slides under a lip of a bendable portion on the host receptacle, such as illustrated in FIGS. 1–3 of U.S. Pat. No. 6,570,768. The member 28 separates the tab 26 from within a slot on a host receptacle, thus unlocking the transceiver module 10 from a host receptacle.

The wedge or slidable member 28 is driven towards the tab 26 by rotating a free end 31 of the bail 12 outwards, away from the first end 14 of the module 10. The bail 12 includes a bump, bend, notch, or similar type of extension 30 on the rotatably mounted portion 32 of the bail 12. As the bail 12 rotates outward away from the face 38 of the module 10, the extension 30 is rotated, and force is applied to an actuation surface 34 on the member 28, thus driving the member 28 towards the tab 26. Inclined portions 36 on the member 28 fit under a lip of a bendable portion of the host device, separating the tab 26 from within a slot on the host device, and thus releasing the module 10 from a host device.

After the free end 31 of the bail 12 is rotated outward away from the face 38 of the module 10, which drives the member or wedge 28 towards the tab 26, the exposed free end 31 can be used as a handle by an operator to manually pull out the module 10 from within a host device. The outward rotated bail 12 functions as a handle to enable the module 10 to be removed, even if a spring release mechanism of the host device fails.

The release lever or bail 12 is preferable constructed of a durable material, such as metal. The free end 31 of the bail 12 can include a roller 40 surrounding a portion of the free end 31. The roller 40 reduces rotational friction between the hand of an operator and the bail 12. The roller 40 is preferable constructed of plastic or metal.

The rotatably mounted portion 32 of the bail 12 is mounted to the first side 24 of the module 10 using a mounting plate 42. Posts 44 located on the bottom or first side 24 of the module 10 fit into apertures 46 on the mounting plate 42 in order to properly align the mounting plate 42 to the first side 24. The mounting plate 42 can be secured to the first side 24 by gluing, sonic welding, or staking. The mounting plate 42 functions to secure the lever 12 and the slidable member 28 to the module 10.

The mounting plate 42 includes extensions 48 for rotatably mounting the bail 12 within a slot or notch 50 in the first side 24 of the module 10. The mounting plate 42 also includes extensions 49 for slidably mounting and guiding the slidable member or wedge 28 to the first side 24 of the module 10. The extensions 48 and 49 are preferably formed in the mounting plate 42 by bending cut out portions of the mounting plate 42. The mounting plate 42 is preferably constructed of metal or rigid plastic.

FIGS. 4–6 illustrate multiple transceiver modules 10 having the first sides 24 mounted to opposing sides of a printed circuit board (PCB) 52. Grounding clips 54 of an EMI shield or cover 56 are in electrical contact with a faceplate 58 of the host device. The faceplate 58 includes square apertures 60 for properly positioning the modules 10 in a stacked arrangement. The faceplate 58 is preferably made of metal and functions to provide a chassis ground for the modules 10 via the cover 56, which is in direct electrical contact with the faceplate 58.

Figure 7A:
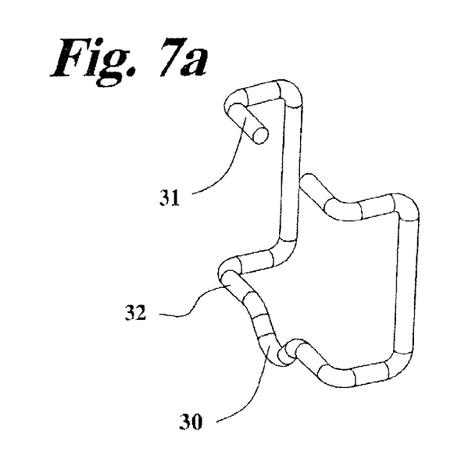
FIGS. 7a, 7b and 7c are perspective views of the release lever on the transceiver module shown in FIG. 1.
Figure 7B:
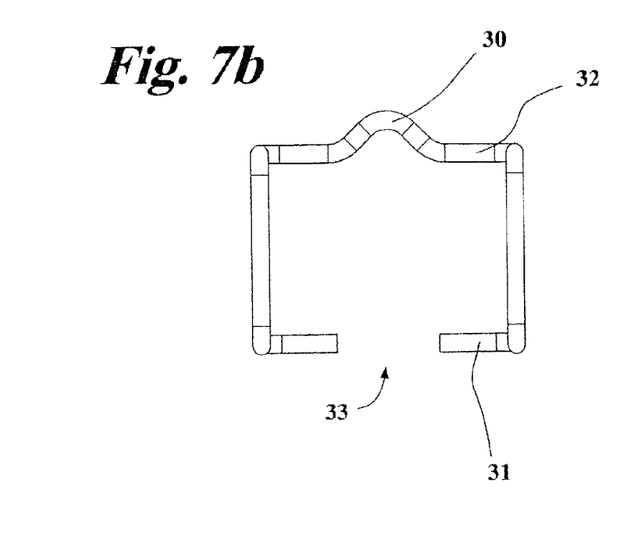
Figure 7C:
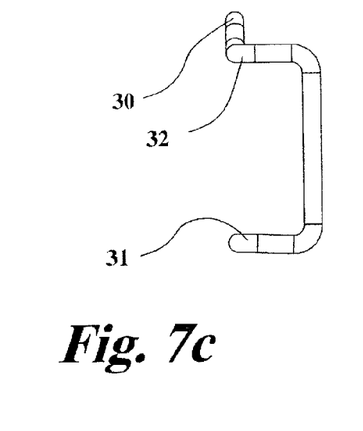
Figure 8A:
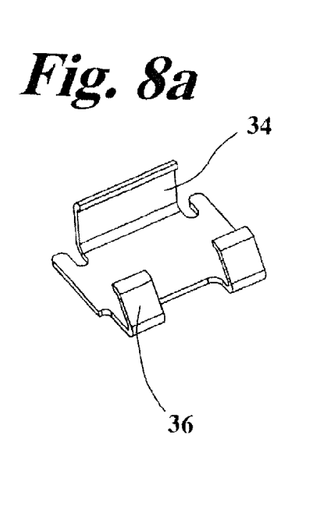
FIGS. 8a, 8b, 8c, 8d, and 8e are perspective views of the member on the transceiver module shown in FIG. 1.
Figures 8B, 8C:
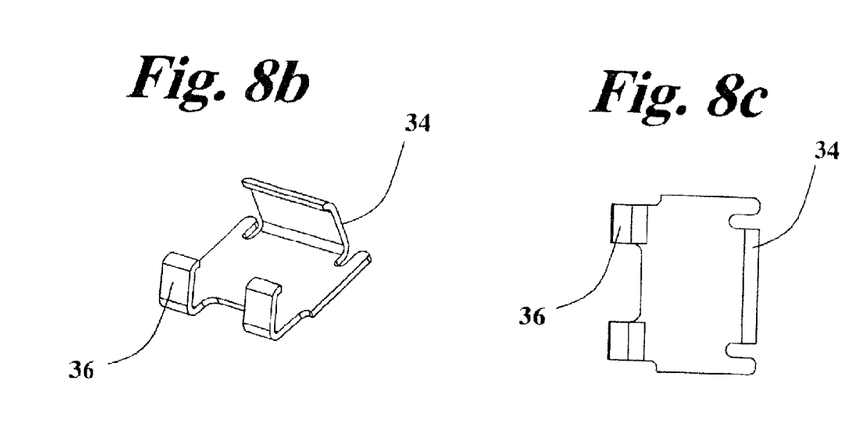
Figure 8D:
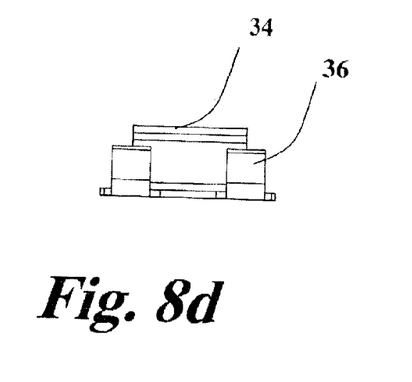
Figure 8E:
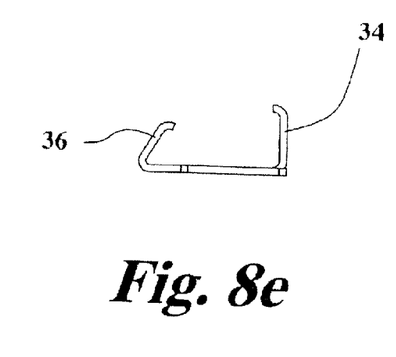

FIGS. 7a–7c illustrate different angle views of the release lever or bail 12 shown in FIGS. 1–6. The extension or bend 30 is shown on the rotatably mounted portion 32 of the bail 12. The free end 31 is illustrated to preferably include an open section 33, which enables the roller 40 to be easily installed on the free end 31. The bail 12 is preferably formed out of a single piece of a metal rod or thick wire.

FIGS. 8a–8e illustrate different angle views of the slidable member or wedge 28 shown in FIGS. 1–6. The actuation surface 34 of the slidable member 28 is illustrated. The inclined portions 36 of the slidable member 28 are also illustrated. The slidable member 28 is preferably formed from a single piece of metal.

Figure 9A:
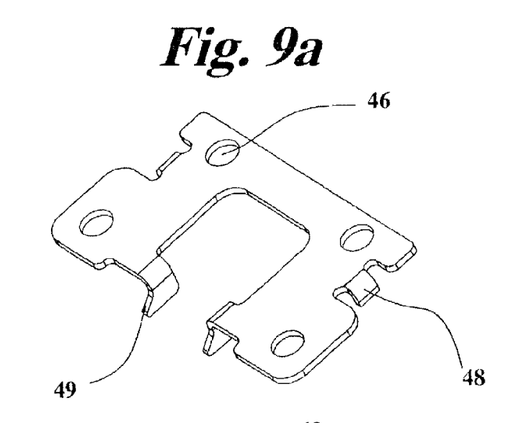
FIGS. 9a, 9b, 9c, and 9d are perspective views of the mounting plate on the transceiver module shown in FIG. 1.
Figure 9B:
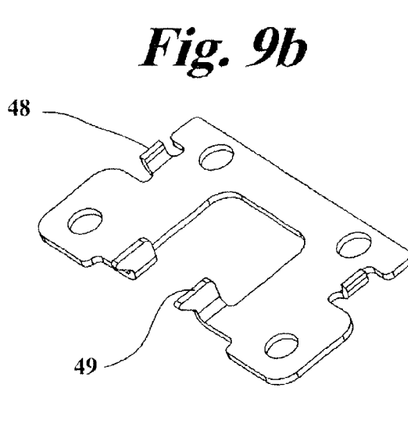
Figure 9C:
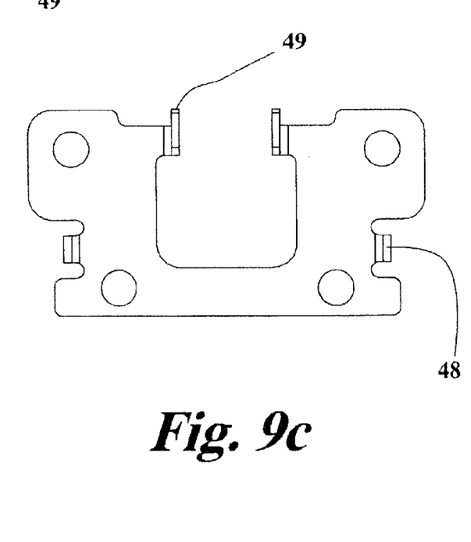
Figure 9D:
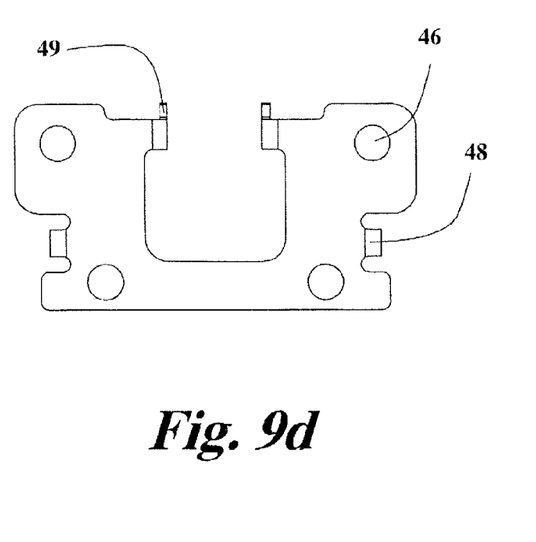

FIGS. 9a–9d illustrate different angle views of the mounting plate 42 shown in FIGS. 1–6. The mounting plate 42 is preferably constructed out of a single piece of metal. FIGS. 9a–9b illustrate the apertures 46 in the mounting plate 42. Also illustrated are the extensions 48 for securing the rotatably mounted portion 32 of the bail 12 within the notch 50 of the module 10. Similarly, extensions 49 of the mounting plate 42 is illustrated for slidably mounting the slidable member 28 on the first side 24 of the module 10.

When the lever 12 is in a locked position, as shown in FIG. 1, the handle or free end 31 is positioned adjacent to the housing and the bump 30 is positioned away from the housing. Also, the bump 30 contacts the actuation surface 34 of the member 28, and the member 28 is separated from the tab 26 by a first distance.

When the bump 30 contacts the actuation surface 34 of the member 28, when the lever 12 is rotated from the locked position to the un-locked position, the member 28 is moved closer to the tab 26. The member 28 is made of a substantially rigid material. Additionally, the member 28 is constrained between the mounting plate 42 and the housing. Thus, when the bump 30 applies a force to the member 28, the member 28 is only able to move in a direction substantially parallel to a length dimension direction of the housing. The member 28 is not able to substantially move in a direction perpendicular to the length dimension of the housing. Also, the manner in which the member 28 is retained between the mounting plate 42 and the housing, the member 28 is unable to rotate. Therefore, the member 28 can only translate in a direction substantially parallel to the length dimension of the housing.

When the lever 12 is in an un-locked position, the handle 31 is positioned away from the housing and the bump 30 is positioned adjacent to the housing. Also, the bump 30 contacts the actuation surface 34 of the member 28, and the member 28 is separated from the tab 26 by a second distance. Therefore, the first distance is greater than the second distance.

It is to be understood that the foregoing description is merely a disclosure of particular embodiments and is no way intended to limit the scope of the invention. Other possible modifications will be apparent to those skilled in the art and all modifications are to be defined by the following claims.

What is claimed is:

1. A device comprising:
   a housing having a surface, the housing having a tab projecting from the surface;
   a printed circuit board mounted to the housing, the printed circuit board having contact traces;
   a member positioned near the tab, the member having an actuation surface, the member moveable relative to the tab and to the surface of the housing in only a translational direction and not a rotational direction, the member made of a substantially rigid material; and
   a lever rotatably mounted to the housing, the lever having a rotatably mounted portion, and a free end, the rotatably mounted portion having a bump, and the free end forming a handle, and wherein,
   in a locked position of the lever, the handle is positioned adjacent to the housing and the bump is positioned away from the housing, and the bump contacts the actuation surface of the member, and wherein the member is separated from the tab by a first distance, and wherein,
   in an un-locked position of the lever, the handle is positioned away from the housing and the bump is positioned adjacent to the housing, and the bump contacts the actuation surface of the member, and wherein the member is separated from the tab by a second distance, and wherein the first distance is greater than the second distance.

2. A device according to claim 1 wherein the lever is made of a metallic material.

3. A device according to claim 2 wherein the member is a made of a metallic material.

4. A device according to claim 2 wherein the member is made of a plastic material.

5. A device according to claim 1 wherein the member is a made of a metallic material.

6. A device according to claim 1 wherein the member is made of a plastic material.

7. A device comprising:
   a housing having a surface, the housing having a tab projecting from the surface;
   a printed circuit board mounted to the housing, the printed circuit board having contact traces;
   a member positioned near the tab, the member having an actuation surface, the member made of a substantially rigid material;
   a mounting plate attached to the housing, and wherein the mounting plate restricts motion of the member in a direction perpendicular to a length of the housing so that the member is moveable relative to the tab and to the surface of the housing in only a translational direction, which is substantially parallel to the length of the housing, and not a rotational direction; and
   a lever mounted between the housing and the mounting plate, the lever being rotatable relative to the housing and the mounting plate, the lever having a rotatably mounted portion, and a free end, the rotatably mounted portion having a bump, and the free end forming a handle, and wherein,
   in a locked position of the lever, the handle is positioned adjacent to the housing and the bump is positioned away from the housing, and the bump contacts the actuation surface of the member, and wherein the member is separated from the tab by a first distance, and wherein,
   in an un-locked position of the lever, the handle is positioned away from the housing and the bump is positioned adjacent to the housing, and the bump contacts the actuation surface of the member, and wherein the member is separated from the tab by a second distance, and wherein the first distance is greater than the second distance.

8. A device according to claim 7 wherein the lever is made of a metallic material.

9. A device according to claim 8 wherein the member is a made of a metallic material.

10. A device according to claim 8 wherein the member is made of a plastic material.

11. A device according to claim 9 wherein the mounting plate is made of a plastic material.

12. A device according to claim 7 wherein the member is made of a metallic material.

13. A device according to claim 7 wherein the member is made of a plastic material.

14. A device according to claim 7 wherein the mounting plate is made of a metallic material.

* * * * *